United States Patent Office  3,573,326
Patented Mar. 30, 1971

3,573,326
6-AMINO-2-THIENYL-4-CHROMANONE HYDRAZONES
Pierre Fournari, 10 Rue Reaumur; Jean Tirouflet, 25 Rue de Beauregard; and Claude Boichot, 89 Boulevard Mansard, all of Dijon, France
No Drawing. Original application Oct. 5, 1966, Ser. No. 584,366, now Patent No. 3,468,897, dated Sept. 23, 1969. Divided and this application Sept. 22, 1969, Ser. No. 871,147
Int. Cl. C07d 63/12
U.S. Cl. 260—332.3                        3 Claims

ABSTRACT OF THE DISCLOSURE 6-amino-2-phenyl or heterocyclic-4-chromanone hydrazones and the pharmaceutically acceptable nontoxic salts thereof are useful as sedatives and muscle relaxants in mammals.

CROSS-REFERENCE TO RELATED APPLICATIONS

This application is a divisional application of application Ser. No. 584,366, now U.S. Pat. No. 3,468,897, patented Sept. 23, 1969.

This invention relates to novel compounds. More particularly, this invention relates to novel compounds which possess valuable therapeutic utility as sedatives and muscle relaxants and to processes useful in the preparation thereof. In another aspect, this invention relates to a novel method of producing sedation and muscle relaxation in mammals.

It is an object of this invention to provide a new class of therapeutic compounds. It is another object of the present invention to provide novel compounds having sedative and muscle relaxant activity. It is a further object of the present invention to provide a process for preparing the novel therapeutic compounds. It is a still further object of the present invention to provide a novel method of producing sedation and muscle relaxation in mammals.

These and other objects which may appear as the specification proceeds are achieved by this invention which comprises the provision of compounds selected from the group consisting of compounds having the following formula (I)

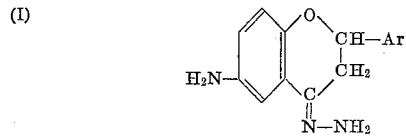

wherein Ar is a member selected from the group consisting of (II)      (III)      (IV)

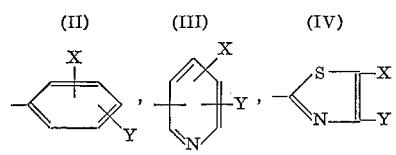

(V)      (VI)      (VII)

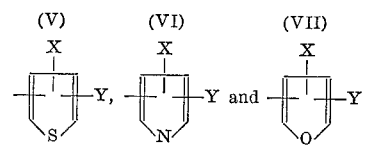

wherein X and Y are each a member selected from the group consisting of hydrogen, chloro, bromo, oido, fluoro, trifluoromethyl, nitro, (lower)alkyl, (lower)alkoxy, cyano, (lower)alkylthio and di(lower)alkylamino, and the pharmaceutically acceptable nontoxic salts thereof.

The pharmaceutically acceptable nontoxic salts include the organic and inorganic acid addition salts, e.g., those prepared from acids such as hydrochloric, sulfuric, sulfamic, tartaric, fumaric, hydrobromic, hydriodic, glycolic, citric, maleic, phosphoric, succinic, acetic, nitric, cyclohexylsulfamic, naphthalenesulfonic, methane sulfonic and the like.

The term "(lower)alkyl" as used herein means both straight and branched chain aliphatic hydrocarbon radicals containing from 1 to 8 carbon atoms, e.g. methyl, ethyl, propyl, isopropyl, butyl, isobutyl, t-butyl, amyl, hexyl, 2-ethylhexyl, octyl, etc.

Similarly, where the term "(lower)" is used as part of the description of another group, e.g., (lower)alkoxy, it refers to the alkyl portion of such group which is therefore as described in connection with "(lower)alkyl."

A preferred group of compounds of this invention are those of the formula (VIII)

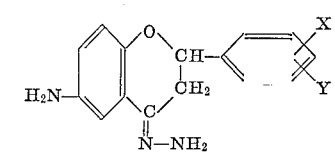

wherein X and Y are as described above.

The compounds of the present invention are prepared according to the following general procedure which consists of reacting a 6-amino-4-chromanone of the formula (IX)

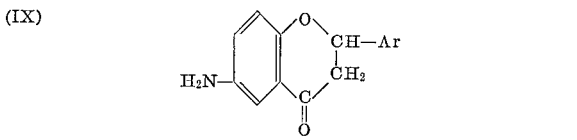

wherein Ar is as described, with hydrazine or a hydrate or salt thereof, e.g. hydrazine hydrate, hydrazine iodide, hydrazine, sulfate, hydrazine dichloride, hydrazine tartrate and the like, preferably in a nonreactive solvent such as ethanol and at room temperature and for at least about 24 hours. When a hydrazine salt is used in the foregoing reaction, the reaction should be carried out in the presence of an acid binding agent such as triethylamine, or a strong base, e.g. sodium hydroxide and sodium acetate. The general procedure described above for the preparation of the compounds of this invention is described by Kallay et al., Tetrahedron 21, 19 (1965).

The starting materials used to prepare the compounds of this invention are either known or can be easily prepared in accordance with standard organic procedures described in the literature. For example, methods for the preparation of 4-chromanones are described by Peng Li Cheng et al., Bull. Soc. Chim. France, 2248 (1963); A. Corvaisier, Bull. Soc. Chim. France, (1962) and Raval et al., J. Org. Chem. 21, 1408 (1956). The 6-amino-4-chromanones of Formula IX are conveniently prepared according to the following reaction scheme as exemplified below:

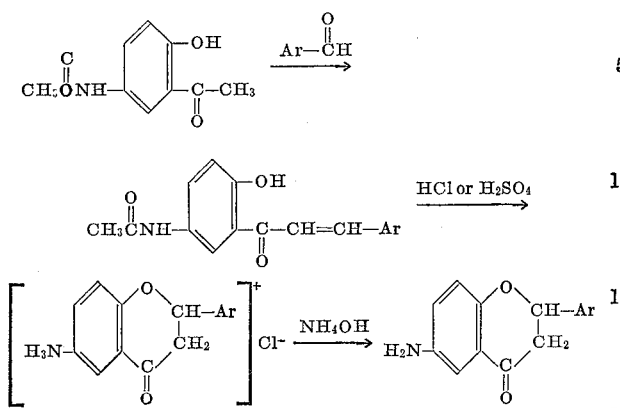

wherein Ar is as described above.

The compounds of the present invention contain an asymmetric carbon atom and thus normally occur as a racemic mixture of the two optical isomers. Both isomers are active, and both of these isomers and mixtures thereof are included within the scope of the present invention. The individual isomers are prepared in pure form from a racemic mixture by resolution with an optically active acid, e.g. camphorsulfonic acid, tartaric acid, by the procedure used on similar amines, e.g. α-phenethylamine, amphetamine.

The compounds of this invention possess sedative activity and muscle relaxant activity making them useful for sedation and muscle relaxation of mammals.

Doses as low as 40 mg./kg. p.o. of this compound in mice exhibited muscle relaxant activity. The activity was determined by pressing the abdomen and flexing the hind limbs of the treated mouse. Limb tone and grip strength were further checked by placing the mice on a vertical pole. A mouse treated with a muscle relaxant drug shows little if any resistance to flexing or abdominal tone and is unable to climb the pole or to maintain itself on the pole.

The sedative activity of the compounds of the present invention was evaluated by the behavioral depression and reflex depression tests. In the behavioral depression test, treated mice are observed in an undisturbed condition for signs of behavioral depression and are checked for their reaction to selected auditory, nociceptive and tactile stimuli. At the same time, a subjective evaluation of spontaneous motor activity is made. In the reflex depression test, the presence or absence of the righting, pinna and corneal reflexes are determined in the treated mice. The pinna and corneal reflexes are elicited by a fine wire, while the righting reflex is considered to be depressed if the mice, when placed on their back, do not right themselves within 30 minutes. When, for example, the preferred compound of the present invention, 6-amino-2-phenyl-4-chromanone hydrazone, was tested, it exhibited sedative activity at doses as low as 40 mg./kg. p.o.

The compounds of this invention may be administered as the free bases or in the form of their nontoxic addition salts. They may be compounded and formulated into pharmaceutical preparations in unit dosage form for oral or parenteral administration wtih organic or inorganic solid materials or liquids which are pharmaceutically acceptable carriers. The compositions may take the form of tablets, powders, granules, capsules, suspensions, solutions and the like. Such compositions are considered within the scope of this invention.

The compounds of this invention when administered orally or parenterally in an effective amount are effective in producing sedation and muscle relaxation in mammals.

The following examples are intended to illustrate the invention described herein without unduly restricting it.

EXAMPLE 1

Preparation of 6-amino-2-phenyl-4-chromanone

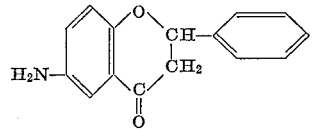

1-(2-hydroxy-5-acetaminophenyl)-3-phenyl-2-propene-1-one

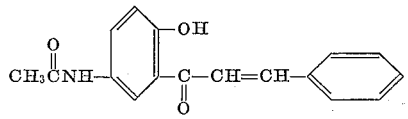

2-hydroxy-5-acetaminoacetophenone (50 g.) [Kunkell, Ber. 34, 124 (1901)] and benzoic aldehyde (27 g.) are dissolved in 360 ml. ethanol. The mixture is stirred and 67 g. sodium hydroxide solution (aqueous) is added in small portions. The mixture is heated to 60° C. for 3 hours with constant agitation. The mixture is cooled, and acidified with hydrochloric acid. The resulting precipitate is washed and recrystallized from ethanol. 1-(2-hydroxy-5-acetaminophenyl)-3-phenyl - 2 - propene-1-one is obtained, having a melting point of 204° C.

6-amino-2-phenyl-4-chromanone 1-(2-hydroxy - 5 - acetaminophenyl)-3-phenyl-2-propene-1-one (8 g.) is dispersed in 600 ml. 5 N hydrochloric acid. The mixture is heated to reflux temperature and after 30 minutes, 15 ml. of 10 N hydrochloric acid is added and the reflux heating continued for 30 minutes. The mixture is then treated with ammonium hydroxide until a pH of 6 is obtained. An orange precipitate separates. The precipitate is filtered and dissolved in ethanol and the solution heated to reflux temperature. After cooling, the product 6-amino-2-phenyl-4-chromanone is precipitated by the addition of cold water and has a melting point of 140° C.

EXAMPLE 2

Preparation of 6-amino-2-phenyl-4-chromanone hydrazone

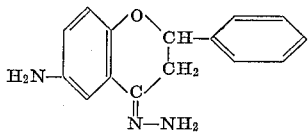

6-amino-2-phenyl-4-chromanone (10 g.) is dissolved in 400 ml. of hot absolute ethanol. The solution is cooled and 9 g. 98% hydrazine hydrate added. The mixture is allowed to stand at room temperature for 24 hours and the hydrazone precipitates. After filtration and drying, there are obtained 6.25 g. of 6-amino-2-phenyl-4-chromanone hydrazone having a melting point of 190° C.

*Analysis.*—Calc'd for $C_{15}H_{15}N_3O$ (percent): C, 71.12; H, 5.97; N, 16.59. Found (percent): C, 71.00; H, 6.03; N, 16.68.

EXAMPLE 3

When, in the procedure of Example 2, 6-amino-2-phenyl-4-chromanone is replaced by an equal molar amount of 6-amino-2-(2-thienyl)-4-chromanone, there is obtained 6-amino-2-(2-thienyl)-4-chromanone hydrazone, having a melting point of 144° C.

EXAMPLE 4

When, in the procedure of Example 2, 6-amino-2-phenyl-4-chromanone is replaced by an equal molar amount of 6-amino-2-(2-pyridyl)-4-chromanone, there is obtained 6-amino-2-(2-pyridyl)-4-chromanone hydrazone, having a melting point of 135° C.

EXAMPLE 5

When, in the procedure of Example 2, 6-amino-2-phenyl-4-chromanone is replaced by an equal molar amount of 6-amino-2-(4-chlorophenyl)-4-chromanone,
6-amino-2-(3-chlorophenyl)-4-chromanone,
6-amino-2-(2-chlorophenyl)-4-chromanone,
6-amino-2-(3,4-dichlorophenyl)-4-chromanone,
6-amino-2-(4-fluorophenyl)-4-chromanone,
6-amino-2-(4-methylphenyl)-4-chromanone,
6-amino-2-(4-trifluoromethylphenyl)-4-chromanone,
6-amino-2-(2-trifluoromethylphenyl)-4-chromanone,
6-amino-2-(3-trifluoromethylphenyl)-4-chromanone,
6-amino-2-(4-methoxyphenyl)-4-chromanone,
6-amino-2-(3-methylthiophenyl)-4-chromanone,
6-amino-2-(4-bromophenyl)-4-chromanone,
6-amino-2-(2-iodophenyl)-4-chromanone,
6-amino-2-(2,4-dichlorophenyl)-4-chromanone,
6-amino-2-(4-nitrophenyl)-4-chromanone,
6-amino-2-(2-bromophenyl)-4-chromanone,
6-amino-2-(4-isopropylphenyl)-4-chromanone,
6-amino-2-(3,4-dimethoxyphenyl)-4-chromanone,
6-amino-2-(4-cyanophenyl)-4-chromanone,
6-amino-2-(4-dimethylaminophenyl)-4-chromanone,
6-amino-2-(3-pyridyl)-4-chromanone,
6-amino-2-(4-pyridyl)-4-chromanone,
6-amino-2-(3-thienyl)-4-chromanone,
6-amino-2-(2-thiazolyl)-4-chromanone,
6-amino-2-(2-chloro-3-thienyl)-4-chromanone,
6-amino-2-(3-chloro-2-thienyl)-4-chromanone,
6-amino-2-(4-chloro-2-thiazolyl)-4-chromanone,
6-amino-2-(5-trifluoromethyl-2-thiazolyl)-4-chromanone,
6-amino-2-(5-chloro-2-thiazolyl)-4-chromanone,
6-amino-2-(3-pyrrolyl)-4-chromanone,
6-amino-2-(2-pyrrolyl)-4-chromanone,
6-amino-2-(3-chloro-4-pyrrolyl)-4-chromanone,
6-amino-2-(2,6-dichloro-4-pyridyl)-4-chromanone,
6-amino-2-(4,5-dichloro-2-thiazolyl)-4-chromanone,
6-amino-2-(2,3-dichloro-4-thienyl)-4-chromanone,
6-amino-2-(2,3-dichloro-4-pyrrolyl)-4-chromanone,
6-amino-2-(3-methyl-2-pyridyl)-4-chromanone,
6-amino-2-(2-furyl)-4-chromanone,
6-amino-2-(3-furyl)-4-chromanone,
6-amino-2-(3-chloro-2-furyl)-4-chromanone and
6-amino-2-(2-methyl-3-furyl)-4-chromanone,
there are obtained,
6-amino-2-(4-chlorophenyl)-4-chromanone hydrazone,
6-amino-2-(3-chlorophenyl)-4-chromanone hydrazone,
6-amino-2-(2-chlorophenyl)-4-chromanone hydrazone,
6-amino-2-(3,4-dichlorophenyl)-4-chromanone hydrazone,
6-amino-2-(4-fluorophenyl)-4-chromanone hydrazone,
6-amino-2-(4-methylphenyl)-4-chromanone hydrazone,
6-amino-2-(4-trifluoromethylphenyl)-4-chromanone hydrazone,
6-amino-2-(2-trifluoromethylphenyl)-4-chromanone hydrazone,
6-amino-2-(3-trifluoromethylphenyl)-4-chromanone hydrazone,
6-amino-2-(4-methoxyphenyl)-4-chromanone hydrazone,
6-amino-2-(3-methylthiophenyl)-4-chromanone hydrazone,
6-amino-2-(4-bromophenyl)-4-chromanone hydrazone,
6-amino-2-(2-iodophenyl)-4-chromanone hydrazone,
6-amino-2-(2,4-dichlorophenyl)-4-chromanone hydrazone,
6-amino-2-(4-nitrophenyl)-4-chromanone hydrazone,
6-amino-2-(2-bromophenyl)-4-chromanone hydrazone,
6-amino-2-(4-isopropylphenyl)-4-chromanone hydrazone,
6-amino-2-(3,4-dimethoxyphenyl)-4-chromanone hydrazone,
6-amino-2-(4-cyanophenyl)-4-chromanone hydrazone,
6-amino-2-(4-dimethylaminophenyl)-4-chromanone hydrazone,
6-amino-2-(3-pyridyl)-4-chromanone hydrazone,
6-amino-2-(4-pyridyl)-4-chromanone hydrazone,
6-amino-2-(3-thienyl)-4-chromanone hydrazone,
6-amino-2-(2-thiazolyl)-4-chromanone hydrazone,
6-amino-2-(2-chloro-3-thienyl)-4-chromanone hydrazone,
6-amino-2-(3-chloro-2-thienyl)-4-chromanone hydrazone,
6-amino-2-(4-chloro-2-thiazolyl)-4-chromanone hydrazone,
6-amino-2-(5-trifluoromethyl-2-thiazolyl)-4-chromanone hydrazone,
6-amino-2-(5-chloro-2-thiazolyl)-4-chromanone hydrazone,
6-amino-2-(3-pyrrolyl)-4-chromanone hydrazone,
6-amino-2-(2-pyrrolyl)-4-chromanone hydrazone,
6-amino-2-(3-chloro-4-pyrrolyl)-4-chromanone hydrazone,
6-amino-2-(2,6-dichloro-4-pyridyl)-4-chromanone hydrazone,
6-amino-2-(4,5-dichloro-2-thiazolyl)-4-chromanone hydrazone,
6-amino-2-(2,3-dichloro-4-thienyl)-4-chromanone hydrazone,
6-amino-2-(2,3-dichloro-4-pyrrolyl)-4-chromanone hydrazone,
6-amino-2-(3-methyl-2-pyridyl)-4-chromanone hydrazone,
6-amino-2-(2-furyl)-4-chromanone hydrazone,
6-amino-2-(3-furyl)-4-chromanone hydrazone,
6-amino-2-(3-chloro-2-furyl)-4-chromanone hydrazone and
6-amino-2-(2-methyl-3-furyl)-4-chromanone hydrazone, respectively.

While this invention has been described and exemplified in terms of its preferred embodiment, those skilled in the art will appreciate that modifications can be made without departing from the spirit and scope of this invention.

What is claimed is:

1. A compound having the formula

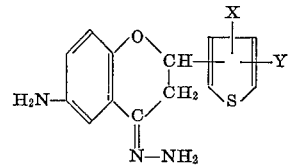

wherein X and Y are each a member selected from the group consisting of hydrogen, chloro, bromo, iodo, fluoro, trifluoromethyl, nitro, (lower)alkyl, (lower)alkoxy, cyano, (lower)alkylthio and di(lower)alkylamino; and the pharmaceutically acceptable nontoxic salts thereof.

2. The compound of claim 1 having the formula

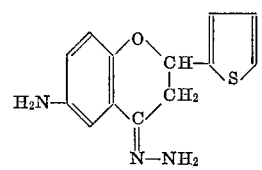

3. The compound of claim 1 having the formula

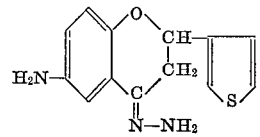

References Cited

UNITED STATES PATENTS 3,468,897   9/1969   Fournari et al. _____ 260—296

JOHN D. RANDOLPH, Primary Examiner

C. M. SHURKO, Assistant Examiner